June 1, 1948.  R. L. BAILEY  2,442,334
ATTACHMENT FOR BABY BUGGIES
Filed April 26, 1945  2 Sheets-Sheet 1

Inventor
Roy L. Bailey
By Clarence A. O'Brien
and Harvey B. Jackson
Attorneys

June 1, 1948. R. L. BAILEY 2,442,334
ATTACHMENT FOR BABY BUGGIES
Filed April 26, 1945 2 Sheets-Sheet 2
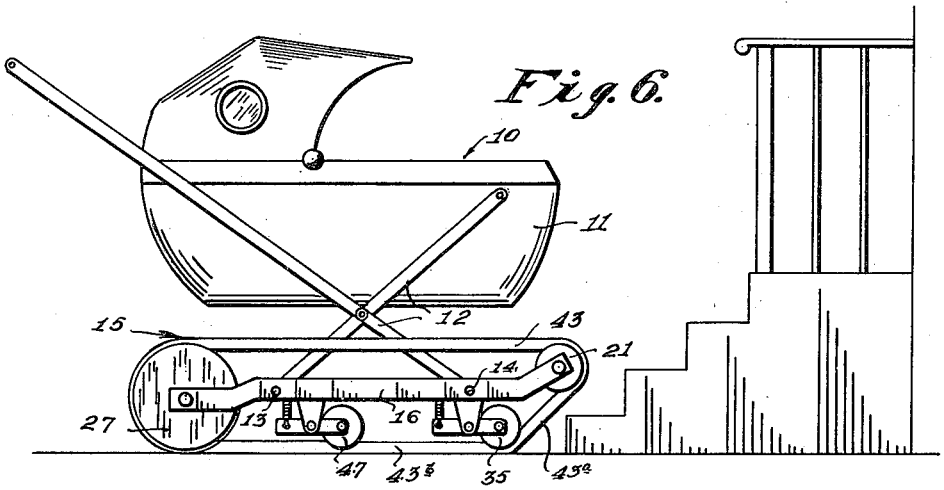
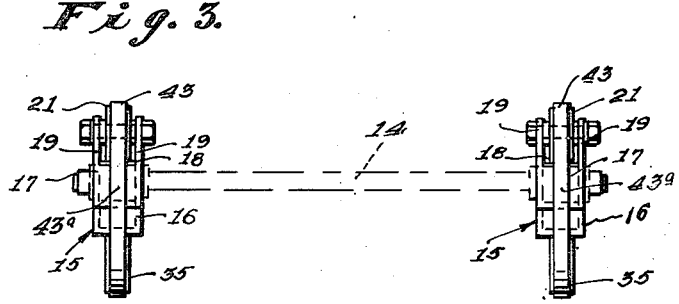
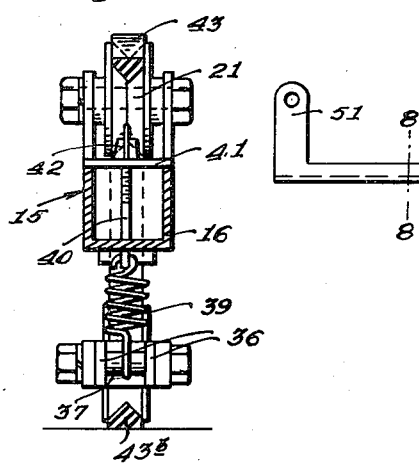
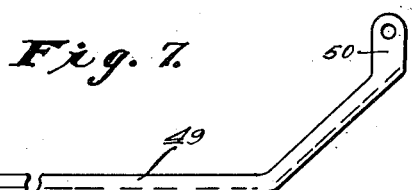
Inventor
Roy L. Bailey,
By Clarence A. O'Brien
and Harvey B. Jacobson
Attorneys Patented June 1, 1948

2,442,334

UNITED STATES PATENT OFFICE 2,442,334

ATTACHMENT FOR BABY BUGGIES

Roy L. Bailey, Denver, Colo.

Application April 26, 1945, Serial No. 590,437

6 Claims. (Cl. 280—1)

This invention relates to an attachment for baby buggies and more particularly to a means to enable a baby buggy to be easily elevated over a curbstone or up a flight of stairs.

The primary object of the invention is an attachment which may be substituted for the ordinary wheels commonly employed on a vehicle of this character and which will enable the user to mount curbs or other obstacles with ease.

The above and other objects may be attained by applying this invention which embodies among its features a pair of separate units each comprising a frame member having apertures to accommodate the ends of the axles of a baby buggy upon which wheels are normally mounted, pulleys at opposite ends of the frame member and an endless belt trained over the pulleys and serving as a ground contacting track along which the baby buggy may be moved with ease.

Other features embody an upwardly inclined portion of the belt adjacent its forward end to facilitate its mounting of curbstones and like obstacles.

Still other features embody runners which may be attached to the equipment so that it may be employed as a sled in the winter time upon snow and ice.

In the drawings—

Figure 3 is a front view of Figure 1.

Figure 5 is an enlarged transverse sectional view taken on the line 5—5 of Figure 2 through one of the wheel substitutes.

Figure 6 is a side view in elevation of a baby buggy showing the application of this invention thereto.

Figure 7 is a side view of a runner which may be attached to the wheel substitutes for use on snow and ice.

Figure 1:
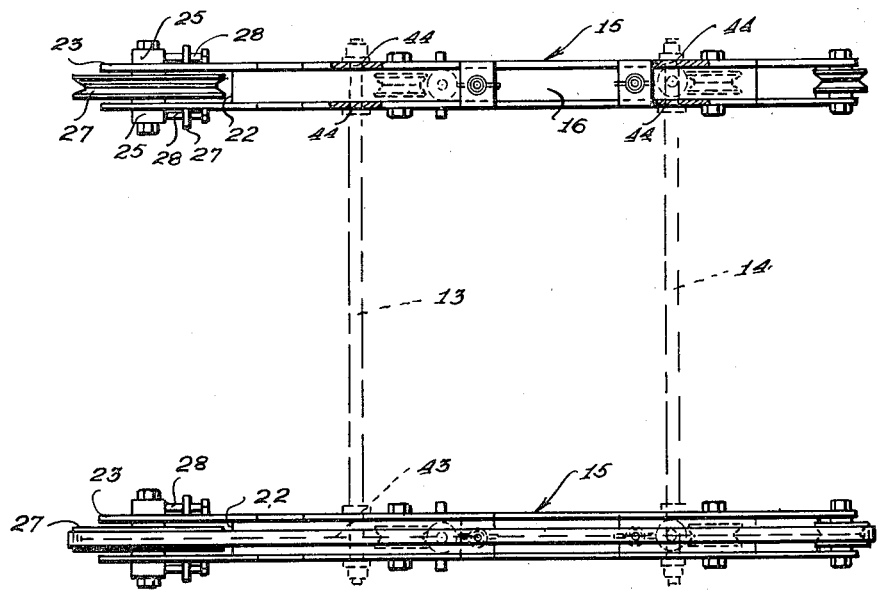
Figure 1 is a top plan view of this baby buggy attachment having portions thereof in section to more clearly illustrate the details of construction.

Referring to the drawings in detail a baby buggy designated generally 10 comprising a body 11 and the usual supporting frame 12, carries axles 13 and 14 upon which wheels are normally mounted.

In place of the wheels I employ wheel substitutes designated generally 15 which are attached to opposite ends of the axles 13 and 14 as illustrated in Figure 1. Each of these wheel substitutes comprises a frame member 16 which in the present instance takes the form of a channel section, and formed at the forward end of the frame member is an upward and forwardly inclined extension 17. Near the extreme forward end of the extension 17 the web portion of the channel is cut away as at 18 to form a pair of parallel ears 19 which are pierced to receive an axle 20 upon which a grooved pulley 21 is rotatably mounted. The web of the channel adjacent its rear end is cut away as at 22 to form a pair of parallel arms 23 each of which is formed with a longitudinal slot 24 in which a block 25 is slidably mounted. This block is pierced to receive an axle 26 upon which a relatively large pulley 27 is rotatably mounted. Extending outwardly from the arms 23 at the extreme inner end of the slots 24 are ears 27 through which externally screw-threaded studs 28 project with their rear ends bearing against the blocks 25 by means of which the blocks and the mechanism carried thereby may be bodily moved rearwardly toward the open end of the slots 24 to regulate the tension of the belt to be more fully hereinafter described.

Figure 2:
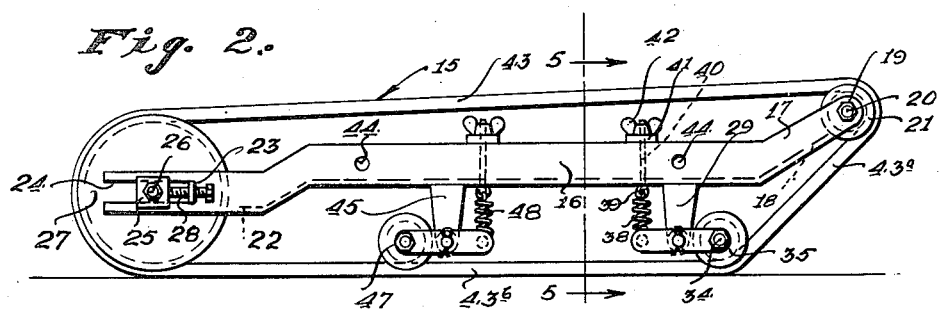
Figure 2 is a side view in elevation of Figure 1.
Figure 4:
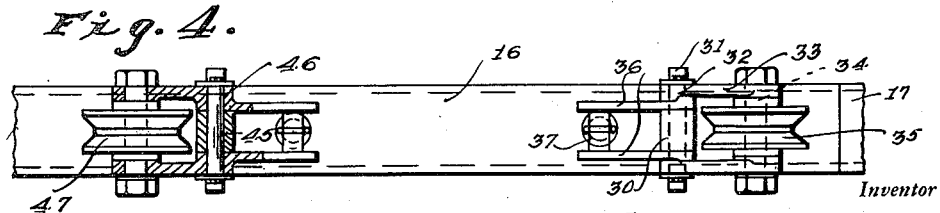
Figure 4 is an enlarged bottom plan view of one of the wheel substitutes showing parts in section to more clearly illustrate the details of construction.

Depending from the undersides of the frames 16 near the junction with the extensions 17 are brackets 29 the lower ends of which terminate in transversely extending barrels 30 (Figure 4) through which pivot pins 31 are thrust. Pivotally mounted on the pivot pins 31 are yokes 32 each of which is formed with a pair of forwardly extending arms 33 which, in turn, are pierced near their forward ends to receive an axle shaft 34 upon which grooved pulleys 35 are mounted. Extending in the opposite directions from the arms 33 are spaced parallel arms 36 which are connected adjacent their outer ends by a bar member 37 to which the lower end of a coil spring 38 is attached. The upper end of the coil spring 38 is connected by means of a loop to the hook end 39 of an adjusting bolt 40 which projects upwardly through a bridge piece 41 carried on the upper edges of the flanges of the frame member 16 as shown in Figures 2 and 5. Threaded on the upper ends of the rods 40 are wing nuts 42 by means of which the tension of the spring 38 may be governed. It will thus be seen that the pulley 35 is yieldingly held in extended position for the support of an endless belt 43 which as shown in Figures 2 and 6 is trained over pulleys 21, 27 and 35 so that the front run 43a of the belt inclines upwardly and serves to aid the vehicle to mount obstacles such as a curbstone.

As illustrated in Figures 1 and 2 the frame members 16 are pierced at 44 to receive the ends of the axles 13 and 14 of the baby buggy.

Pivotally mounted on a bracket 45 secured to the underside of the frame 16 between the bracket 29 and the rear end of the frame is a yoke 46 which corresponds in every respect to the yoke 32 previously described which carries a grooved pulley 47 held in yielding engagement with the bottom run of the belt 43b by means of the spring 48.

In operation it will be seen that it is but a simple matter to remove the wheels from the axles 13 and 14 of the baby buggy and to substitute therefor the wheel substitutes 15. The belt 43 then forms tracks along which the buggy moves and when an obstacle, such as a curbstone is encountered, the run 43a of the belt between the pulleys 21 and 35 serves to aid in mounting the obstacle so that curbstones or stairways may be easily negotiated.

Figure 8:
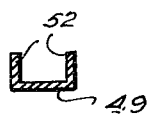
Figure 8 is a transverse sectional view taken on the line 8—8 of Figure 7 on a slightly enlarged scale.

In parts of the country where snows frequently occur I find it desirable to remove the belt and substitute therefor runners 49 (Figures 7 and 8) which are provided with attaching ears 50 and 51 for connection to the axle shafts 20 and 26, respectively. These runners may be placed in position without removing the pulleys from their respective locations as the width between the flanges 52 (Figure 8) is such that the pulleys may be accommodated therebetween.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. The combination with a baby buggy having a pair of spaced transversely extending axles, of a pair of supports adapted to be mounted on the axles in place of wheels, each such support comprising a frame member having spaced apertures adapted to receive the ends of the axles on one side of the buggy, a pulley of relatively large diameter at the rear end of the frame member, an upwardly and forwardly directed extension at the forward end of the frame member, a pulley of relatively small diameter mounted at the extreme upper and forward end of the extension, a pulley of relatively small diameter below the frame member near its junction with the extension, and an endless belt trained over the pulleys, and means to move the large pulley to adjust the tension of the belt.

2. The concentration with a baby buggy having a pair of spaced transversely extending axles, of a pair of supports adapted to be mounted on the axles in place of wheels, each such support comprising a frame member having spaced apertures adapted to receive the ends of the axles on one side of the buggy, a pulley of relatively large diameter at the rear end of the frame member, an upwardly and forwardly directed extension at the forward end of the frame member, a pulley of relatively small diameter at the extreme upper forward end of the extension, a pulley of relatively small diameter yieldingly supported below the frame member near its junction with the extension and an endless belt trained over the pulleys and means to move the large pulley to adjust the tension of the belt.

3. The combination with a baby buggy having a pair of spaced transversely extending axles, of a pair of supports adapted to be substituted on the buggy in place of the wheels, each such support comprising a frame member having spaced apertures adapted to receive the ends of the axles on one side of the buggy, a pulley of relatively large diameter at the rear end of the frame member, an upwardly and forwardly directed extension at the forward end of the frame member, a pulley of relatively small diameter at the extreme upper and forward end of the extension, a pulley of relatively small diameter between the last-named pulley and the large pulley, a belt trained over the pulleys, and means for moving the large pulley for adjusting the tension of the belt.

4. The combination with a baby buggy having a pair of spaced transversely extending axles, of a pair of supports adapted to be substituted on the buggy in place of the wheels, each such support comprising a frame member having spaced apertures adapted to receive the ends of the axles on one side of the buggy, a pulley of relatively large diameter at the rear end of the frame member, an upwardly and forwardly directed extension at the forward end of the frame member, a pulley of relatively small diameter at the extreme upper forward end of the extension, a pulley of relatively small diameter yieldingly supported below the frame member near its junction with the extension, an endless belt trained over the pulleys, and means to move the large pulley for adjusting the tension of the belt.

5. The combination with a baby buggy having a pair of spaced transversely extending axles, of a pair of supports adapted to be mounted on the axles in place of wheels, each such support comprising a frame member having spaced apertures adapted to receive the ends of the axles on one side of the buggy, a pulley of relatively large diameter at the rear end of the frame member, an upwardly and forwardly directed extension at the forward end of the frame member, a pulley of relatively small diameter at the extreme upper forward end of the extension, a pulley of relatively small diameter yieldingly supported below the frame member near its junction with the extension, a pulley yieldingly supported below the frame between the first-mentioned yieldingly supported pulley and the large pulley and an endless belt trained over the pulleys.

6. The combination with a baby buggy having a pair of spaced transversely extending axles, of a pair of supports adapted to be mounted on the axles in place of wheels, each such support comprising a frame member having spaced apertures adapted to receive the ends of the axles on one side of the buggy, a pulley of relatively large diameter at the rear end of the frame member, an upwardly and forwardly directed extension at the forward end of the frame member, a pulley of relatively small diameter at the extreme upper forward end of the extension, a pulley of relatively small diameter yieldingly supported below the frame member near its junction with the extension, a pulley yieldingly supported below the frame between the first-mentioned yieldingly supported pulley and the large pulley, an endless belt trained over the pulleys, and means for moving the large pulley for adjusting the tension of the belt.

ROY L. BAILEY.

REFERENCES CITED

The following references are of record in the file of this patent:

UNITED STATES PATENTS

| Number | Name | Date |
|---|---|---|
| 606,494 | Weddell et al. | June 28, 1898 |
| 1,278,931 | Houghton | Sept. 17, 1918 |
| 2,072,222 | Schuttkus | Mar. 2, 1937 |
| 2,319,008 | McCormack | May 11, 1943 |

FOREIGN PATENTS

| Number | Country | Date |
|---|---|---|
| 390,063 | Germany | Feb. 18, 1924 |
| 539,798 | Germany | Dec. 2, 1931 |